US010101030B2

(12) United States Patent
Dudebout et al.

(10) Patent No.: US 10,101,030 B2
(45) Date of Patent: Oct. 16, 2018

(54) GAS TURBINE ENGINES WITH PLUG RESISTANT EFFUSION COOLING HOLES

(71) Applicant: HONEYWELL INTERNATIONAL INC., Morristown, NJ (US)

(72) Inventors: Rodolphe Dudebout, Phoenix, AZ (US); Eric Blumer, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1034 days.

(21) Appl. No.: 14/475,106

(22) Filed: Sep. 2, 2014

(65) Prior Publication Data
US 2016/0061451 A1 Mar. 3, 2016

(51) Int. Cl.
F23R 3/06 (2006.01)
F23R 3/00 (2006.01)
F01D 5/18 (2006.01)
F01D 9/02 (2006.01)
F23R 3/04 (2006.01)

(52) U.S. Cl.
CPC ............ F23R 3/06 (2013.01); F01D 5/186 (2013.01); F01D 9/023 (2013.01); F23R 3/002 (2013.01); F23R 3/04 (2013.01); F05D 2260/202 (2013.01); F23R 2900/03041 (2013.01); F23R 2900/03042 (2013.01); Y02T 50/675 (2013.01)

(58) Field of Classification Search
CPC .... F23R 3/06; F23R 3/002; F23R 3/04; F23R 2900/03041; F23R 2900/03042; F01D 5/186; F01D 9/023; F05D 2260/202
See application file for complete search history.

(56) References Cited

U.S. PATENT DOCUMENTS 3,811,276 A * 5/1974 Caruel ............ F23R 3/08
60/757
5,609,779 A * 3/1997 Crow ............ B23K 26/389
219/121.71

(Continued)

FOREIGN PATENT DOCUMENTS

EP 1820937 A2 8/2007

OTHER PUBLICATIONS

Hudson R., et al.; Laser drilling aids cool running for gas turbines—Industrial Laser Solutions; Laser ablation can remove TBC and bond coat efore drilling; http://www.industrial-lasers.com/articles/print/volume-26/issue-1/features/laser-drilling-aids-cool-running-for-gas-turbines.html.

Primary Examiner — Gerald L Sung
Assistant Examiner — Scott Walthour
(74) Attorney, Agent, or Firm — Lorenz & Kopf, LLP

(57) ABSTRACT

A combustor for a turbine engine is provided. A first liner has a first surface and a second surface. A second liner forms a combustion chamber with the second side of the first liner, and the combustion chamber configured to receive an air-fuel mixture for combustion therein. The first liner defines a plurality of effusion cooling holes configured to form a film of cooling air on the second surface of the first liner. The plurality of effusion cooling holes includes a first effusion cooling hole extending from the first surface to the second surface and including an inlet portion extending from the first surface, a metering portion fluidly coupled to the inlet portion, and an outlet portion fluidly coupled to the metering portion and extending to the second surface. The inlet portion is larger than the metering portion.

18 Claims, 4 Drawing Sheets

(56) References Cited

U.S. PATENT DOCUMENTS

| | | | | |
|---|---|---|---|---|
| 6,241,468 B1* | 6/2001 | Lock | ............ | F01D 5/186 |
| | | | | 415/115 |
| 7,563,073 B1 | 7/2009 | Liang | | |
| 7,938,951 B2 | 5/2011 | Lee et al. | | |
| 2007/0036942 A1* | 2/2007 | Steele | ............ | F01D 25/12 |
| | | | | 428/131 |
| 2007/0241084 A1* | 10/2007 | Hoebel | ............ | F01D 5/005 |
| | | | | 219/121.71 |
| 2010/0229564 A1* | 9/2010 | Chila | ............ | F23R 3/06 |
| | | | | 60/752 |
| 2010/0263384 A1* | 10/2010 | Chila | ............ | F23R 3/10 |
| | | | | 60/755 |
| 2014/0219814 A1* | 8/2014 | Heselhaus | ............ | F01D 5/186 |
| | | | | 416/96 R |

\* cited by examiner

GAS TURBINE ENGINES WITH PLUG RESISTANT EFFUSION COOLING HOLES

TECHNICAL FIELD

The following discussion generally relates to gas turbine engine combustors, and more particularly, to combustors with improved effusion cooling holes.

BACKGROUND

A gas turbine engine may be used to power various types of vehicles and systems. A particular type of gas turbine engine that may be used to power aircraft is a turbofan gas turbine engine. A turbofan gas turbine engine may include, for example, five major sections: a fan section, a compressor section, a combustor section, a turbine section, and an exhaust section. The fan section is positioned at the front or inlet section of the engine and includes a fan that induces air from the surrounding environment into the engine and accelerates a fraction of this air toward the compressor section. The remaining fraction of air induced into the fan section is accelerated into and through a bypass plenum and out the exhaust section.

The compressor section raises the pressure of the air received from the fan section to a relatively high level. The compressed air from the compressor section then enters the combustor section, where one or more fuel nozzles injects fuel into the compressed air. The fuel-air mixture is ignited in the combustor section to generate combustion gases. The high-energy combustion gases from the combustor section then flow into and through the turbine section, thereby causing rotationally mounted turbine blades to rotate and generate energy. The air exiting the turbine section is exhausted from the engine via the exhaust section.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the combustor components, such as the combustor liners, to prevent or reduce adverse impact and extend useful life. Mechanisms for cooling the combustor liners include effusion cooling techniques. Effusion cooling involves a matrix of relatively small diameter effusion cooling holes extending through the combustor liners to admit a flow of cooling compressor discharge air. The combustor has an "inside" surface exposed to combustion gases and an "outside" surface exposed to compressor discharge air. The effusion cooling holes are typically angled relative to a surface of the combustor to generate a cooling film on the inside wall of the liner as a buffer from combustion gases. However, given the high temperature of engine operation, cooling remains a challenge. As an example, the small diameter effusion cooling holes may be susceptible to plugging by particles within the engine air flow.

Accordingly, it is desirable to provide combustors with improved effusion cooling arrangements. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a turbine engine is provided. A first liner has a first surface and a second surface. A second liner forms a combustion chamber with the second side of the first liner, and the combustion chamber configured to receive an air-fuel mixture for combustion therein. The first liner defines a plurality of effusion cooling holes configured to form a film of cooling air on the second surface of the first liner. The plurality of effusion cooling holes includes a first effusion cooling hole extending from the first surface to the second surface and including an inlet portion extending from the first surface, a metering portion fluidly coupled to the inlet portion, and an outlet portion fluidly coupled to the metering portion and extending to the second surface. The inlet portion is larger than the metering portion.

In accordance with another exemplary embodiment, a gas turbine engine includes a compressor section configured to compress air; a combustor section fluidly coupled to the compressor section and including a combustor liner forming a combustion chamber in which the compressed air is mixed with fuel and combusted to generate combustion gases. The combustor liner has an inner surface and an outer surface and defines a plurality of effusion cooling holes, each extending between the outer surface and the inner surface. The plurality of effusion cooling holes includes a first effusion cooling hole with an inlet portion extending from the outer surface, a metering portion fluidly coupled to the inlet portion, and an outlet portion fluidly coupled to the metering portion and extending to the inner surface. The inlet portion is larger than the metering portion. The engine further includes a turbine section fluidly coupled to the combustor section to receive the combustion gases and extract energy from the combustion gases.

In accordance with another exemplary embodiment, a component for a gas turbine engine is provided. A body has a first surface and a second surface, the first surface being exposed to cooling air and the second surface being exposed to combustion gases in the gas turbine engine. A plurality of angled cooling holes are formed in the body and direct the cooling air from the first surface to the second surface to form a film of cooling air on the second surface of the body. The plurality of angled cooling holes includes a first angled cooling hole extending from the first surface to the second surface and includes an inlet portion extending from the first surface, a metering portion fluidly coupled to the inlet portion, and an outlet portion fluidly coupled to the metering portion and extending to the second surface, the inlet portion being larger than the metering portion.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with combustors having improved effusion cooling. In one embodiment, the effusion cooling holes may have enlarged inlet portions and/or curved inlet edges relative to the metering sections. This may enable smoother flow into and through each effusion cooling hole to prevent or mitigate particles separating from the airflow and accumulating and blocking the hole, thereby enabling more efficient cooling and/or operation at higher temperatures.

Figure 1:
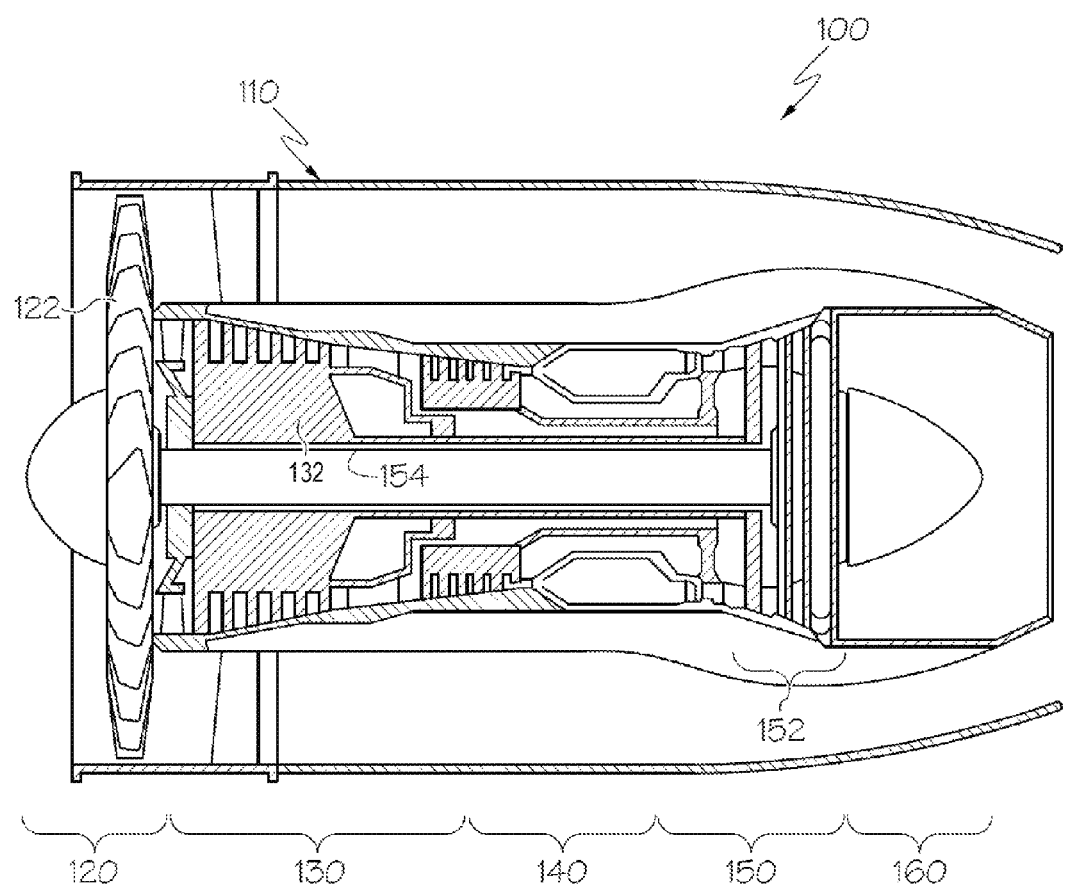
FIG. 1 is a simplified cross-sectional side view of a gas turbine engine according to an exemplary embodiment.

FIG. 1 is a simplified, cross-sectional view of a gas turbine engine 100 according to an embodiment. The engine 100 may be disposed in an engine case 110 and may include a fan section 120, a compressor section 130, a combustor section 140, a turbine section 150, and an exhaust section 160. The fan section 120 may include a fan 122, which draws in and accelerates at least a portion of the air into the compressor section 130. The compressor section 130 may include a series of compressors 132 that raise the pressure of the air directed from the fan 122. The compressors 132 then direct the compressed air into the combustor section 140. In the combustor section 140, the high pressure air is mixed with fuel and combusted. The combusted air is then directed into the turbine section 150.

The turbine section 150 may include a series of turbines 152, which may be disposed in axial flow series. The combusted air from the combustor section 140 expands through and rotates the turbines 152 prior to being exhausted through the exhaust section 160. In one embodiment, the turbines 152 rotate to drive equipment in the engine 100 via concentrically disposed shafts or spools. Specifically, the turbines 152 may drive the compressors 132 via one or more rotors 154. FIG. 1 depicts one exemplary configuration, and other embodiments may have alternate arrangements. The exemplary embodiments discussed herein are not limited to use in conjunction with a particular type of turbine engine.

Figure 2:
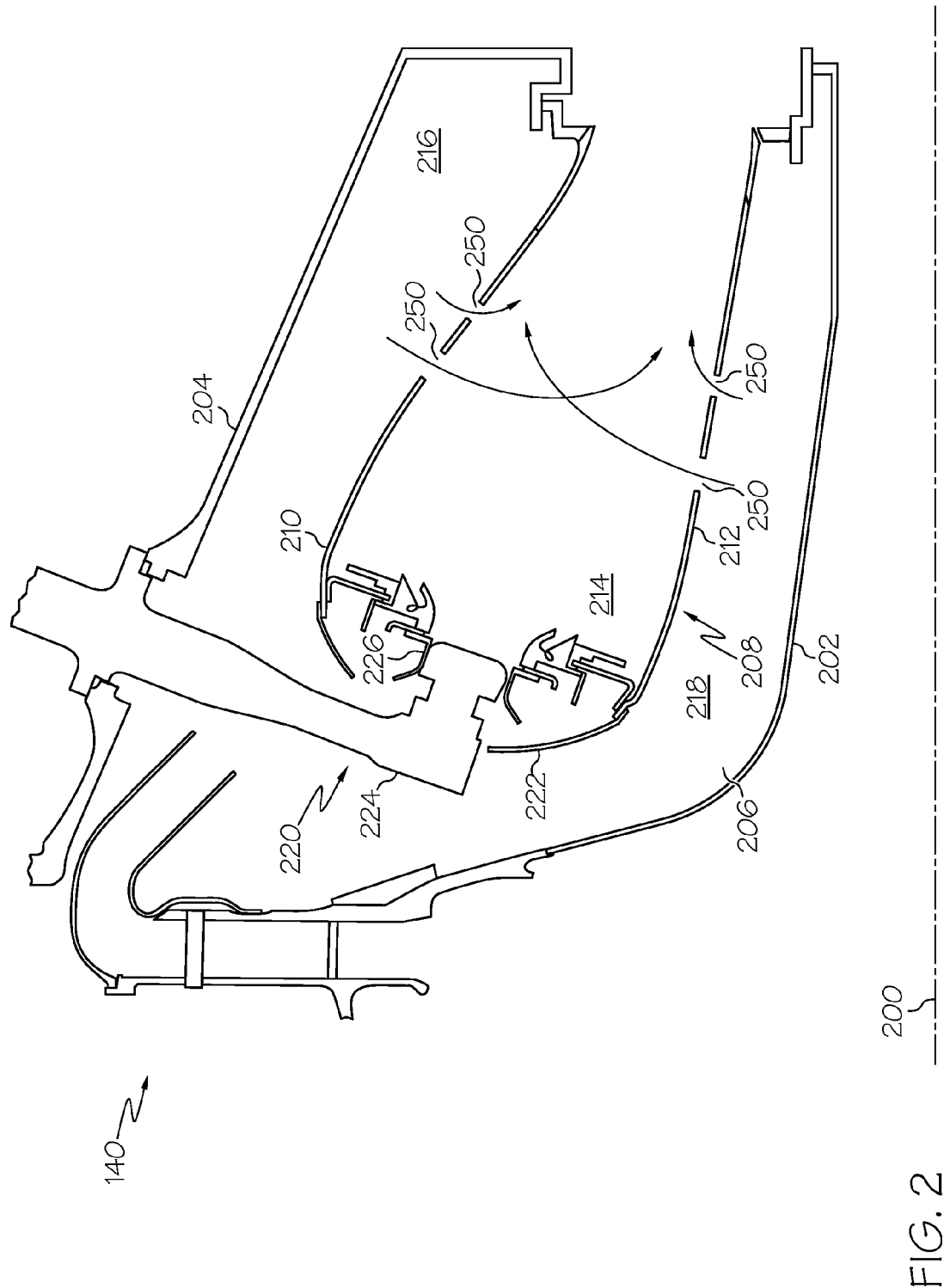
FIG. 2 is a partial cross-sectional view of a combustion section of the engine of FIG. 1 in accordance with an exemplary embodiment.

FIG. 2 is a more detailed cross-sectional view of the combustor section 140 of FIG. 1. In FIG. 2, only half the cross-sectional view is shown; the other half would be substantially rotationally symmetric about a centerline and axis of rotation 200. The combustor section 140 of FIG. 2 is an annular combustor section 140, although aspects of exemplary embodiments described herein may also be useful in can combustors, can-annular combustors, and other types of combustors. Exemplary embodiments are applicable to both commercial and military gas turbine engines and auxiliary power units. Moreover, exemplary embodiments may find beneficial uses in many industries, including aerospace and particularly in high performance aircraft, as well as automotive, marine and power generation.

The combustor section 140 includes a radially inner case 202 and a radially outer case 204 concentrically arranged with respect to the inner case 202. The inner and outer cases 202, 204 circumscribe the axially extending engine centerline 200 to define an annular pressure vessel 206. The combustor section 140 also includes a combustor 208 residing within the annular pressure vessel 206. The combustor 208 is defined by an outer liner 210 and an inner liner 212 that is circumscribed by the outer liner 210 to define an annular combustion chamber 214. The liners 210, 212 cooperate with cases 202, 204 to define respective outer and inner air plenums 216, 218.

The combustor 208 includes a front end assembly 220 comprising a dome assembly 222, fuel injectors 224, and fuel injector guides 226. One fuel injector 224 and one fuel injector guide 226 are shown in the partial cross-sectional view of FIG. 2, although a number of fuel injectors 224 may be disposed about the combustor 208. Each fuel injector 224 introduces a swirling, intimately blended fuel-air mixture that supports combustion in the combustion chamber 214.

In one exemplary embodiment, the combustor 208 may be a rich burn, quick quench, lean burn (RQL) combustor, although further exemplary embodiments may provide other types of combustion processes. During operation, a portion of the pressurized air enters the combustion chamber 214 by way of passages in the front end assembly 220. The air is intermixed with fuel introduced through the fuel injectors 224 and ignited by an igniter (not shown) to support initial combustion. Additional air for further combustion flows from the plenum 216, 218 into the combustion chamber 214 through air admission holes 250 in the outer and inner liner 210, 212. Two rows of air admission holes 250 are depicted in FIG. 2, although other arrangements may be provided. As noted above, the resulting combustion gases exit the combustion chamber 214 and are directed to the turbine section for energy extraction.

As also noted above, the engine components are subject to extremely high temperatures resulting from the combustion process. If unaddressed, the extreme heat may affect the useful life of components and/or impact the maximum operating temperature of the engine. As such, cooling techniques and/or mechanisms may be provided to maintain temperatures at acceptable levels. Such cooling may include effusion cooling techniques, as described in greater detail below.

Figure 3:
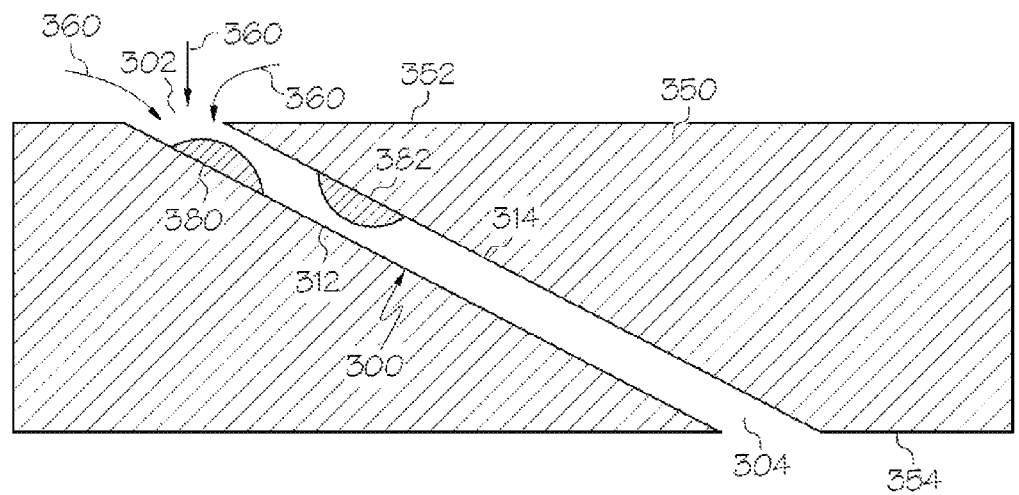
FIG. 3 is a cross-sectional view of an effusion cooling hole of a conventional combustor.

In general, the effusion cooling holes (not shown in FIG. 2) are relatively small, closely spaced holes formed in various engine components, including one or both of the liners 210, 212. The effusion cooling holes may be referred to as "angled cooling holes." These holes serve to direct a flow of relatively cool air from the plenums 216, 218, through the combustor liner 210, 212, and onto the inner surface of the liner 210, 212. The effusion cooling holes are typically angled at, for example, 1°-45° (particularly, 10°-30°) to the surface of the liner 210, 212, and may be oriented to discharge at various angles relative to the bulk combustor gas flow, such that a film of cooling air forms on the inner surface of the respective liner 210, 212, e.g., the surface facing the combustion chamber 214. The film of cooling air functions to protect the liner 210, 212 from the elevated temperatures of the combustion gases. Effusion cooling may also be used in other components, including combustor domes, heat shields, and turbine components, and the effusion (or angled) cooling holes discussed herein are applicable to those components, e.g., such effusion cooling holes may be defined in the body of such components exposed to combustion gases to direct cooling air from a first (or outside) side, through the body, and to a second (or inside) side to form a film of cooling air Given the relatively small size, conventional effusion cooling holes tend to become partially or completely blocked by particles (e.g., dust, sand, and/or debris) flowing through the engine. One such example is provided by a conventional effusion cooling hole 300 in FIG. 3. In FIG. 3, the effusion cooling hole 300 extends through a liner 350 from a first (or cold) surface (or side) 352 to a second (or hot) surface (or side) 354. Air flow 360 flows into an inlet 302 of the effusion cooling hole 300, through the hole 300, and out of an outlet 304. As noted above, particles may be present in the engine air flow, including the air flow 360 through the effusion cooling hole 300. It has been determined that such particles are problematic, particularly very fine sand particles, e.g., particles with a diameter less than 20 microns.

According to exemplary embodiments discussed herein, it has been determined that particles tend to accumulate in effusion cooling holes 300 in one or more areas as plugs 380, 382. In conventional cooling hole arrangements, a first plug 380 may accumulate relatively near the inlet 302 on a first side 312 (e.g., the obtuse side) of the cooling hole 300, and a second plug 382 may form on a second side 314 of the cooling hole 300 downstream of the first plug 380. These plugs 380, 382 may accumulate for a number of reasons, and other plugs may also form. The first plug 380 may form as a result of air flow 360 containing particles from an opposite side (e.g., from the right side of the arrangement of FIG. 3) striking the first side 312 of the hole 300 and the particles contained therein being unable to make the turn through the hole 300. Subsequently, the first plug 380 may redirect air flow 360 such that with particles strike the other side (e.g., the second side 314), thereby forming the second plug 382. Other characteristics that may result in plugs (including plugs 380, 382) may be internal roughness and/or recirculation zones within the hole 300 that result in stagnation and deposits. It has been determined that this issue is exacerbated at higher temperatures. Upon recognition of these characteristics, the exemplary embodiments discussed below address such issues.

Figure 4:
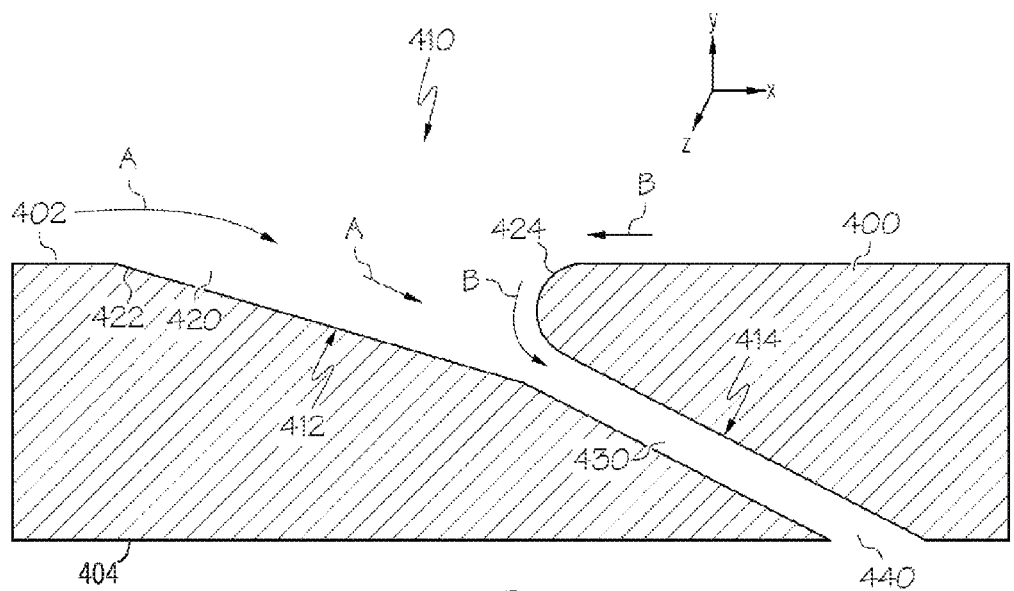
FIG. 4 is a cross-sectional view of an effusion cooling hole of the combustion section of FIG. 2 in accordance with an exemplary embodiment.

FIG. 4 is a cross-sectional view of an effusion cooling hole 410 through a combustor liner 400. The combustor liner 400 may correspond, as an example, to any portion of the outer or inner liner 210, 212 of the combustor 208 of FIG. 2.

In the depicted exemplary embodiment of FIG. 4, the effusion cooling hole 410 extends from a first (or cold) surface (or side) 402 of the liner 400, through the liner 400, and to a second (or hot) surface (or side) 404 of the liner 400. As referenced above, the cold surface 402 generally faces a plenum and the hot surface 404 generally faces the combustion chamber. As discussed below, the effusion cooling hole 410 may be considered to have an inlet portion 420, a metering portion 430, and an outlet portion 440. In one exemplary embodiment, the inlet portion 420 is formed in and extends through the cold surface 402 of the liner 400 and transitions into the metering portion 430, which in turn, transitions into the outlet portion 440 that extends to the hot surface 404 of the liner 400. Additional portions or segments may be provided as necessary or desired.

Generally, the effusion cooling hole 410 may be oriented in any suitable direction relative to local or mainstream air flows. In the depicted embodiment, the effusion cooling hole 410 extends in a first direction (e.g., aligned with main flow direction A) from the cold surface 402 to the hot surface 404. In some exemplary embodiments, the effusion cooling hole 410 may be considered to have a first side (e.g., on the left in FIG. 4) 412 and a second side (e.g., on the right in FIG. 4) 414 with respect to this dimension. Based on the general orientation of the hole 410 relative to the cold surface 402, the first side 412 may also be referred to as the obtuse side, and the second side 414 may also be referred to as the acute side. The effusion hole may also be aligned with main flow B, or in any direction between A and B.

The metering portion 430 will be discussed prior to additional details about the inlet portion 420 and the outlet portion 440. In this exemplary embodiment, the metering portion 430 is generally cylindrical with an approximately constant diameter. In further embodiments, the metering portion 430 may have other cross-sectional shapes, such as oval or may include downstream diffusion (a larger exit area after the metering portion). During operation, the metering portion 430 may function to limit (or meter) the amount of air that flows through the effusion cooling hole 410. Typically, since air used for cooling limits energy generation, it is advantageous to minimize the amount of cooling air while meeting cooling requirements. The metering portion 430 may have any suitable diameter, e.g., between approximately 0.01 inches and approximately 0.04 inches, particularly approximately 0.02 inches.

The inlet portion 420 may have any suitable shape or arrangement to guide air into the effusion cooling hole 410. Such shapes may include circular, oval, fan shapes, or irregular shapes. In accordance with an exemplary embodiment, the inlet portion 420 is enlarged relative to the metering portion 430. In particular, sections of the inlet portion 420 may have cross-sectional areas (e.g., in an xz plane of FIG. 4) that are larger than sections of the metering portion 430. In one exemplary embodiment, such as that shown in FIG. 4, the inlet portion 420 diverges in cross-sectional area from the metering section 430 toward the cold surface 402 such that the largest cross-sectional area of the inlet portion 420 is at the cold surface 402. In other embodiments, the inlet portion 420 may have a relatively constant cross-sectional area, albeit larger than the metering portion 430.

In one exemplary embodiment, the inlet portion 420 has an angled section 422 arranged on the first side 412 of the effusion cooling hole 410. In the depicted exemplary embodiment, the angled section 422 is positioned at a relatively larger interior angle relative to the cold surface 402 than the metering portion 430, thereby contributing to the larger cross-sectional areas formed by the inlet portion 420. Other arrangements and angles may be provided. For example, although the angled section 422 intersects with the cold surface 402 at an angled point, this intersection may alternatively be rounded or curved.

The inlet portion 420 may further have a curved section 424 arranged on the second side 414 of the effusion cooling hole 410. As such, the curved section 424 is on the same side of the inlet portion 420 as the direction that the hole 410 extends through the liner 400, e.g., on the acute side as referenced above. As shown in FIG. 4, the curved section 424 formed at the intersection between the inlet portion 420 and the cold surface 402 such that the curved section 424 may be referred to as a curved inlet edge. The curved section 424 is convex from the surface of the cold surface 402 into the hole 410.

Figure 5:
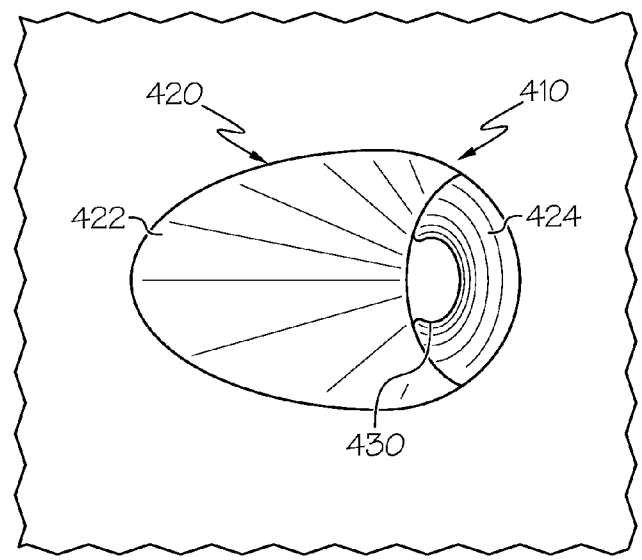
FIG. 5 is a top view of the effusion cooling hole of FIG. 4 in accordance with an exemplary embodiment.

Reference is briefly made to FIG. 5, which is a top view of the effusion cooling hole 410 of FIG. 4. As shown, FIG. 5 depicts the angled section 422 and the curved section 424 of the inlet portion 420 transitioning into the metering portion 430. Additional functions of the inlet portion 420 are discussed below.

Returning to FIG. 4, the outlet portion 440 may have any suitable shape or arrangement. In this exemplary embodiment, the outlet portion 440 has a cross-sectional area that is approximately equal to the metering portion 430.

One or more characteristics of the effusion cooling hole 410 may decrease susceptibility to plugging. Generally, the enlarged inlet portion 420 may minimize or reduce a change in flow direction for a given length as air enters from the cold side 402. As a result, the enlarged inlet portion 420 tends to discourage flow separation as air flow is directed into and through the effusion cooling hole 410. Moreover, the angled section 422 encourages smooth air flow into the hole from the same direction as the first side 412 (e.g., direction A), while the curved section 424 encourages air flow into the hole 410 from the opposite, second side 414 (e.g., direction B). In other words, the curved section 424 functions to more effectively redirect air flow in the direction B around the edge of the inlet portion 420 on the acute side 414 such that separation of the air flow along the surface is reduced into and within the hole 410. This discourages the particles from direction B impacting the obtuse side 412 and "sticking" within the hole 410. As a result, a substantial reduction in particle accretion may occur as compared to conventional effusion cooling holes since any particles tend to remain in the attached cooling air rather than being deposited on a surface within the effusion cooling hole 410. Additionally, although the inlet portion 420 is enlarged, the diameter of the metering portion 430 may be maintained so as not to require additional cooling air than would otherwise be needed, e.g., as compared to enlarging the entire hole.

Figure 6:
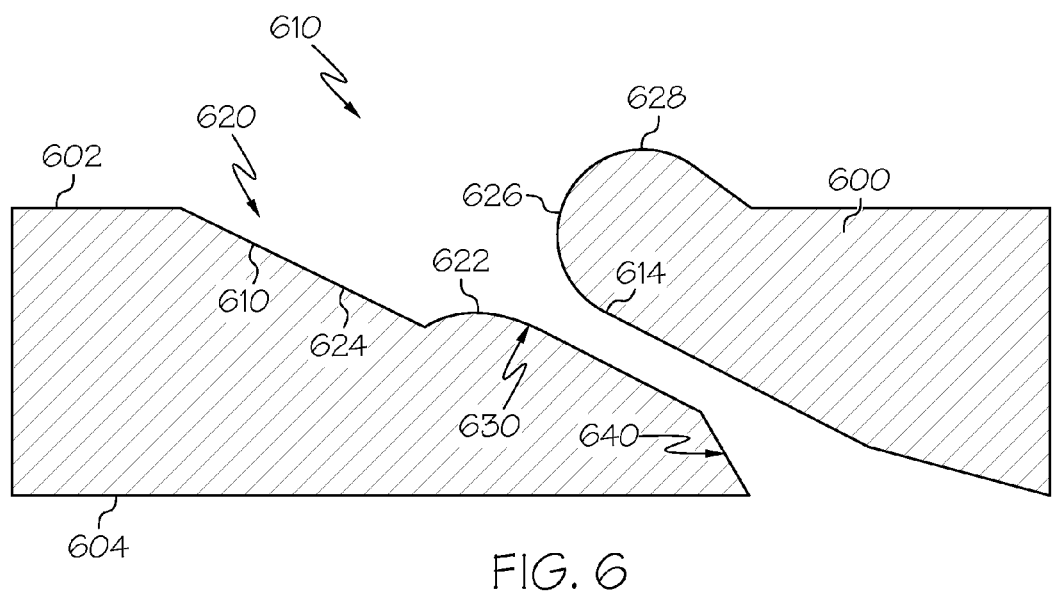
FIG. 6 is a cross-sectional view of an effusion cooling hole of the combustion section of FIG. 2 in accordance with a further exemplary embodiment.

FIG. 6 is a cross-sectional view of an effusion cooling hole 610 through a combustor liner 600. As above, the combustor liner 600 may correspond, as an example, to any portion of the outer or inner liner 210, 212 of the combustor 208 of FIG. 2 and is an alternate exemplary embodiment to the effusion cooling hole 410 of FIG. 4. However, aspects to the effusion cooling hole 410 and effusion cooling hole 610 of FIGS. 4 and 6 may be combined with one another.

As above, the effusion cooling hole 610 extends from a first (or cold) side 602 of the liner 600, through the liner 600, and to a second (or hot) side 604 of the liner 600. As discussed below, the effusion cooling hole 610 may be considered to have an inlet portion 620, a metering portion 630, and an outlet portion 640. Additional portions or segments may be provided as necessary or desired.

The metering portion 630 is generally cylindrical with an approximately constant diameter. In further embodiments, the metering portion 630 may have other cross-sectional shapes, such as oval.

In accordance with an exemplary embodiment, the inlet portion 620 is enlarged relative to the metering portion 630. As shown, sections of the inlet portion 620 may have cross-sectional areas that are larger than sections of the metering portion 630. In this exemplary embodiment, on a first side 602 of the effusion cooling hole 610, the inlet portion 620 includes a transition section 622 at the metering portion 630 and a main section 624. The main section 624 may be at the same angle relative to the cold surface 602 as the metering portion 630 while maintaining the larger cross-sectional area. The transition section 622 functions to smoothly enlarge the hole from the size of the metering portion 630 to the size of the main section 624. Other arrangements and angles may be provided.

The inlet portion 620 may further have a curved section 626 arranged on the second side 614 of the effusion cooling hole 610. In this embodiment, the curved section 626 protrudes beyond the plane formed by the cold surface 602 and forms a continuous curved surface or edge between the cold surface 602 and the metering portion 630. The resulting protrusion 628 of the curved section 626 may have any suitable height above the surface of the cold surface 602. In some conditions, the protruding curved section 626 may assist in guiding air flow into the inlet portion 620 such that separation from the surface is minimized or prevented, which may prevent or mitigate accumulation of particles in the effusion cooling hole 610, as discussed above.

Generally, the outlet portion 640 may have any suitable shape or arrangement. In this exemplary embodiment, the outlet portion 640 is enlarged relative to the metering portion 630. In particular, the outlet portion 640 diverges in cross-sectional area from the metering section 630 to the surface of the second side 604. In some conditions, this arrangement may function to diffuse the air flow from the outlet portion 640 to enhance formation of the cooling film. Other shapes may be provided.

Although the embodiments discussed above generally refer to single-walled combustors, the effusion cooling holes discussed above may additionally be incorporated into double-walled combustors, including a double-walled combustor that utilizes impingement effusion cooling. The effusion cooling holes may be formed by any suitable technique, including casting, EDM drilling, and/or additive manufacturing such as direct metal laser fusion. As an example, the cooling holes may be drilled from the cold surface (e.g., with still percussion or water jet drilling) and taper to the metering portion. The particular placement, diameter, and orientation of effusion cooling holes may be assisted by computation fluid dynamics (CFD) analysis.

Accordingly, exemplary embodiments discussed above provide combustors with improved effusion cooling holes. Since the effusion cooling holes are less likely to be blocked, a reduction in cooling holes and/or a reduction in cooling air may be enabled. Such improved cooling may enhance durability and performance of the combustor components and the overall engine. Exemplary embodiments discussed above may provide a gas turbine engine that operates more efficiently. Additionally, exemplary embodiments may produce combustor components capable of withstanding higher temperatures and stresses, thereby leading to further improvements in engine performance.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine comprising a component, the component comprising:
   a body having a first surface and a second surface, the first surface being exposed to cooling air and the second surface being exposed to combustion gases in the gas turbine engine; and
   a plurality of angled cooling holes formed in the body and direct the cooling air from the first surface to the second surface to form a film of cooling air on the second surface of the body, the plurality of angled cooling holes including a first angled cooling hole extending from the first surface to the second surface and including an inlet portion extending from the first surface, a metering portion fluidly coupled to the inlet portion, the metering portion having a substantially constant diameter, and an outlet portion fluidly coupled to the metering portion and extending to the second surface, the inlet portion being larger than the metering portion, wherein the inlet portion has a first section that forms a curved edge from the first surface to a location along the inlet portion within the first angled cooling hole, the first section of the inlet portion being arranged on an acute side of the inlet portion relative to the first surface, wherein the inlet portion has at least one second section disposed between the first surface and the second surface, the at least one second section forming a first non-zero angle with respect to the first surface and forming a second non-zero angle with respect to the metering portion, and wherein, during operation of the gas turbine engine, cooling air flows from the inlet portion to the outlet portion.

2. The component of claim 1, wherein the inlet portion includes a protrusion extending from a plane defined by the first surface.

3. The component of claim 1, wherein the inlet portion includes a protrusion extending from a plane defined by the first surface, and wherein the protrusion forms a continuously curved edge between the first surface and the metering portion.

4. A combustor for a turbine engine, comprising:
a first liner having a first surface and a second surface; and
a second liner forming a combustion chamber with the second surface of the first liner, the combustion chamber configured to receive an air-fuel mixture for combustion therein;
the first liner defining a plurality of effusion cooling holes configured to form a film of cooling air on the second surface of the first liner, the plurality of effusion cooling holes including a first effusion cooling hole extending from the first surface to the second surface and including an inlet portion extending from the first surface, a metering portion fluidly coupled to the inlet portion, the metering portion having a substantially constant diameter, and an outlet portion fluidly coupled to the metering portion and extending to the second surface, the inlet portion being larger than the metering portion,
wherein the inlet portion has a first section that forms a curved edge from the first surface to a location along the inlet portion within the first effusion cooling hole,
wherein the first section of the inlet portion is on an acute side of the inlet portion relative to the first surface,
wherein the inlet portion has at least one second section disposed between the first surface and the second surface, the at least one second section forming a first non-zero angle with respect to the first surface and forming a second non-zero angle with respect to the metering portion, and
wherein, during operation of the combustor, cooling air flows from the inlet portion to the outlet portion.

5. The combustor of claim 4, wherein the second section of the inlet portion is on an obtuse side of the inlet portion relative to the first surface.

6. The combustor of claim 4, wherein the inlet portion defines a first cross-sectional area and the metering portion defines a second cross-sectional area such that the first cross-sectional area is larger than the second cross-sectional area.

7. The combustor of claim 4, wherein the inlet portion diverges in cross-sectional area from the metering portion to the first surface.

8. The combustor of claim 4, wherein the inlet portion includes a protrusion extending from a plane defined by the first surface.

9. The combustor of claim 8, wherein the protrusion forms a continuously curved edge between the first surface and the metering portion.

10. The combustor of claim 4, wherein the outlet portion is larger than the metering portion.

11. The combustor of claim 10, wherein the outlet portion diverges in cross-sectional area from the metering section to the second surface.

12. The combustor of claim 4, wherein the metering portion is substantially cylindrical.

13. The combustor of claim 4, wherein the curved edge is convex from the first surface into the metering portion of the first effusion cooling hole.

14. A gas turbine engine, comprising:
a compressor section configured to compress air;
a combustor section fluidly coupled to the compressor section and including a combustor liner forming a combustion chamber in which the compressed air is mixed with fuel and combusted to generate combustion gases,
wherein the combustor liner has an inner surface and an outer surface, the combustor liner defining a plurality of effusion cooling holes, each extending between the outer surface and the inner surface, the plurality of effusion cooling holes including a first effusion cooling hole with an inlet portion extending from the outer surface, a metering portion fluidly coupled to the inlet portion, the metering portion having a substantially constant diameter, and an outlet portion fluidly coupled to the metering portion and extending to the inner surface, the inlet portion being larger than the metering portion; and
a turbine section fluidly coupled to the combustor section to receive the combustion gases and extract energy from the combustion gases,
wherein the inlet portion has a first section that forms a curved edge connected with the outer surface,
wherein the first section of the inlet portion is on an acute side of the inlet portion relative to the outer surface,
wherein the inlet portion has at least one second section disposed between the outer surface and the inner surface, the at least one second section forming a first non-zero angle with respect to the outer surface and forming a second non-zero angle with respect to the metering portion, and
wherein, during operation of the gas turbine engine, cooling air flows from the inlet portion to the outlet portion.

15. The gas turbine engine of claim 14, wherein the second section of the inlet portion is on an obtuse side of the inlet portion relative to the outer surface.

16. The gas turbine engine of claim 14, wherein the inlet portion diverges in cross-sectional area from the metering portion to the outer surface.

17. The gas turbine engine of claim 14, wherein the inlet portion includes a protrusion extending from a plane defined by the outer surface.

18. The gas turbine engine of claim 14, wherein the inlet portion includes a protrusion extending from a plane defined by the outer surface, and wherein the protrusion forms a continuously curved edge between the outer surface and the metering portion.

* * * * *